United States Patent [19]

Diener

[11] Patent Number: 4,531,752
[45] Date of Patent: Jul. 30, 1985

[54] MANUAL UTILITY CART

[76] Inventor: Henry Diener, 71121 U.S. 131, White Pigeon, Mich. 49099

[21] Appl. No.: 452,067

[22] Filed: Dec. 22, 1982

[51] Int. Cl.³ .............................................. B62B 1/04
[52] U.S. Cl. ................................. 280/47.18; 211/189; 280/5.22; 280/47.26; 414/446
[58] Field of Search ................ 280/47.18, 47.2, 47.28, 280/47.26, 47.27, 5.22; 414/444, 446, 607, 608; 248/129; 211/60 R, 49 R, 189

[56] References Cited

U.S. PATENT DOCUMENTS

| | | | |
|---|---|---|---|
| 1,006,985 | 10/1911 | Smith | 280/47.18 X |
| 1,103,429 | 7/1914 | Pitkin | 414/446 |
| 2,719,640 | 10/1955 | Copas et al. | 414/446 |
| 3,179,270 | 4/1965 | Taragos | 280/47.18 X |
| 3,718,337 | 2/1973 | Vosbikian | 280/47.26 |
| 4,033,595 | 7/1977 | Mauch | 280/47.2 X |
| 4,413,834 | 11/1983 | Base | 280/47.26 |

Primary Examiner—Joseph F. Peters, Jr.
Assistant Examiner—Michael Mar
Attorney, Agent, or Firm—Eugene C. Knoblock

[57] ABSTRACT

A cart including a detachable carrier for moving firewood from a stockpile to a fireplace within a living quarter. The cart includes large wheels for movement over rough terrain while the cart is loaded and a set of smaller wheels for movement of the cart within buildings. The cart also includes a stair climbing apparatus to enable pulling a loaded cart up a flight of stairs. In one embodiment the smaller wheels are shiftable between a raised and a lowered position for selected usage upon operation of a linkage. In a second embodiment the smaller wheels are journaled on the detachable carrier.

4 Claims, 14 Drawing Figures

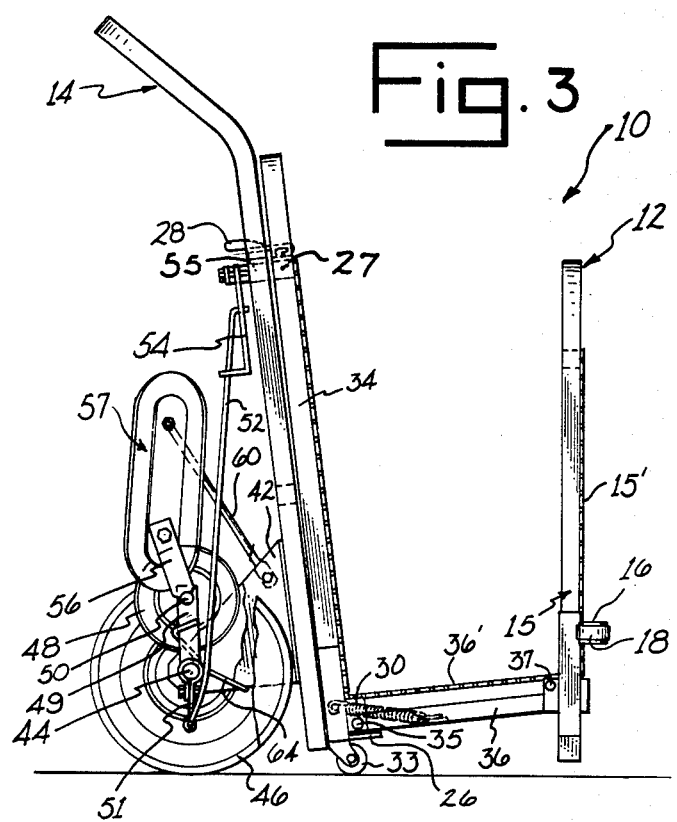

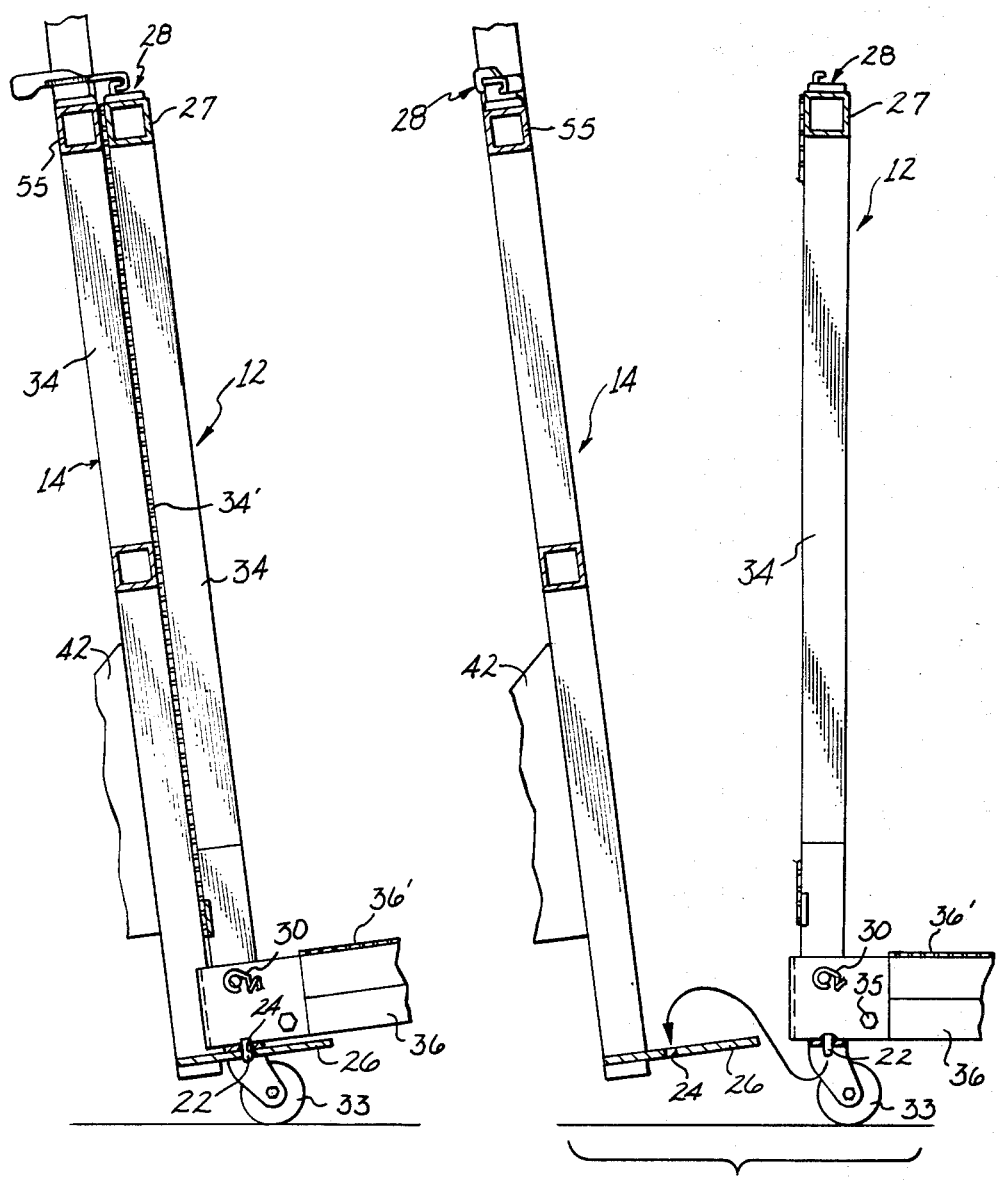

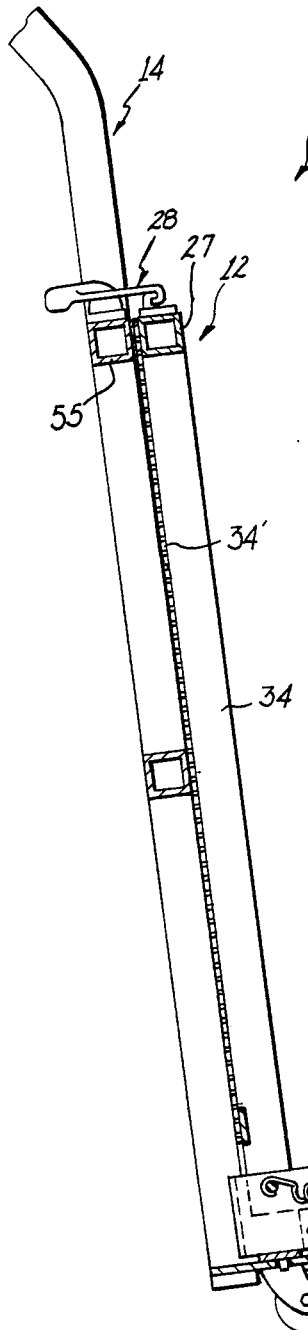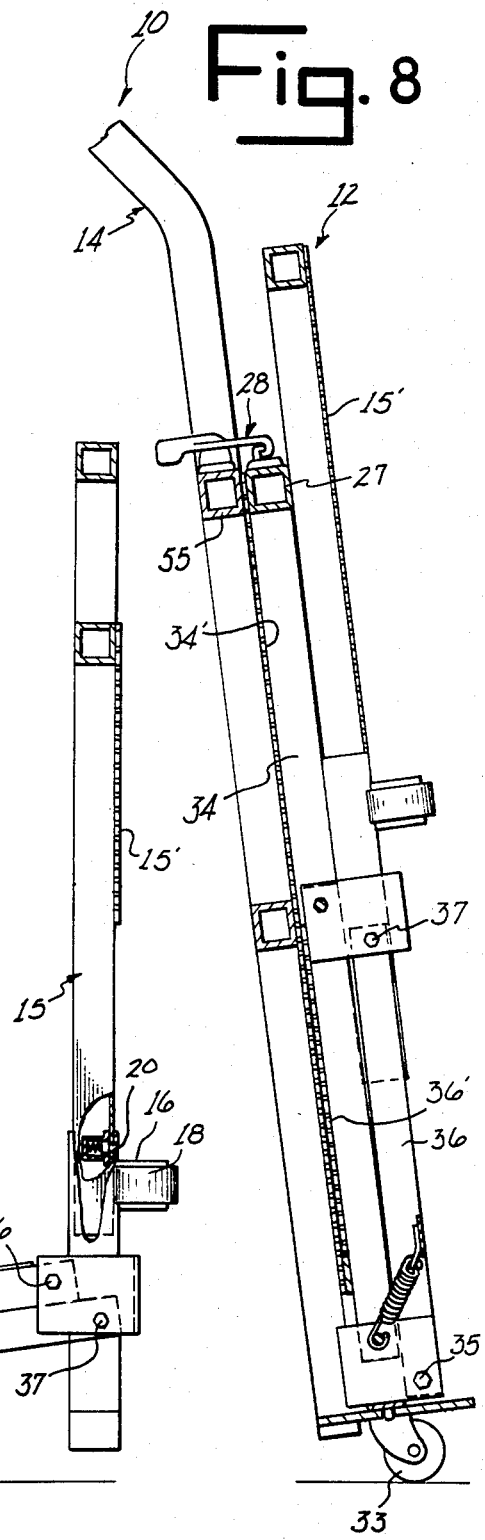

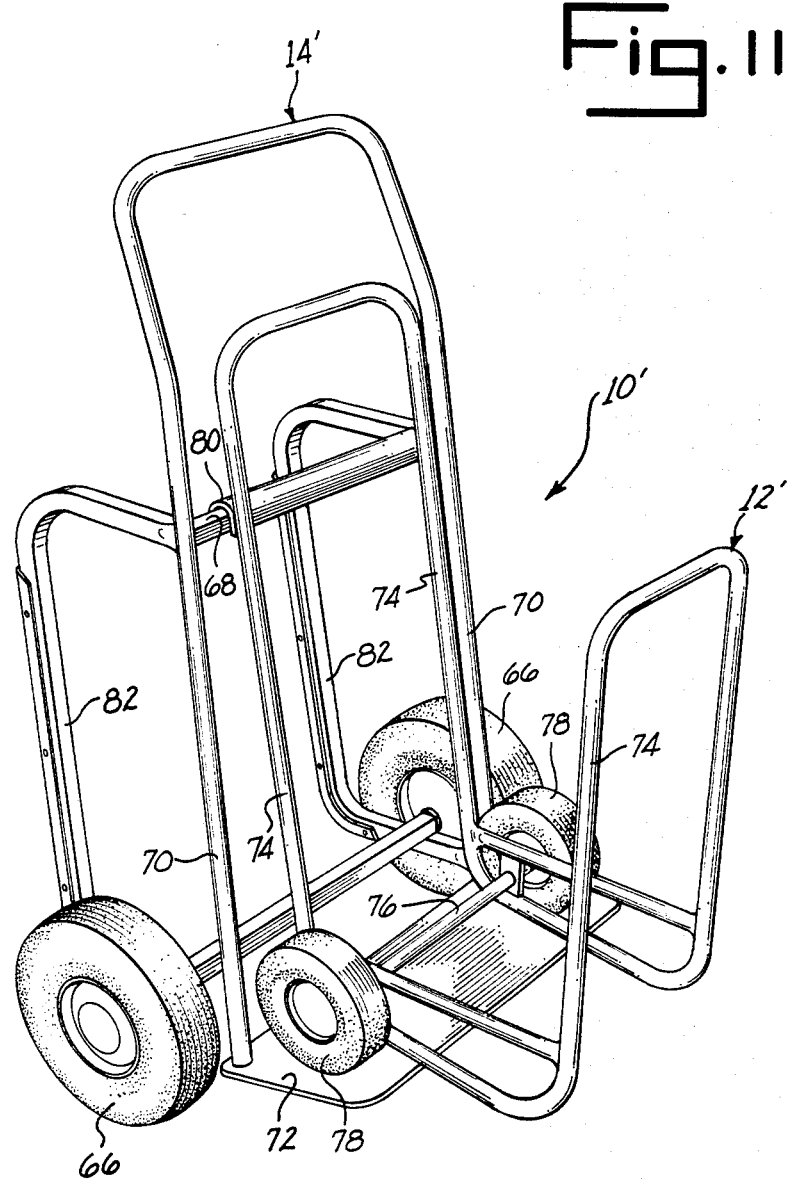

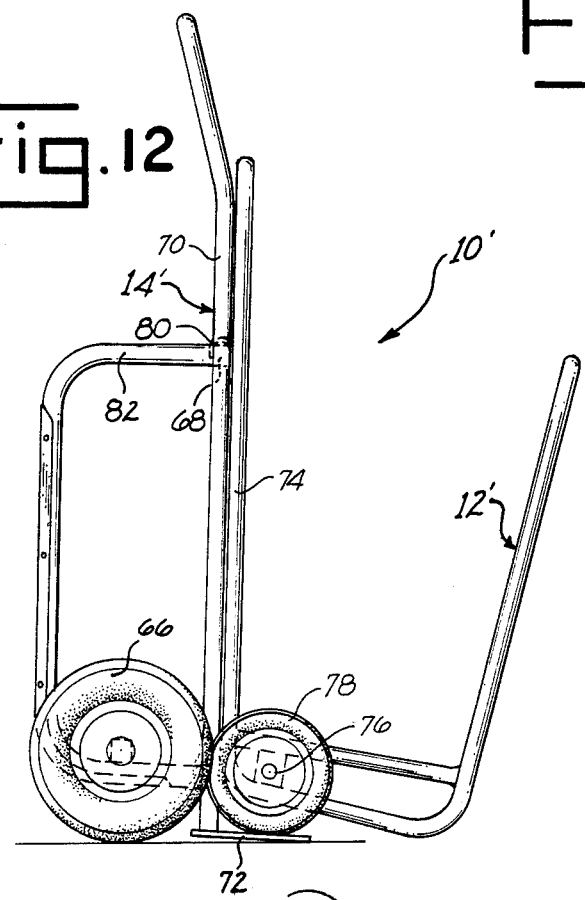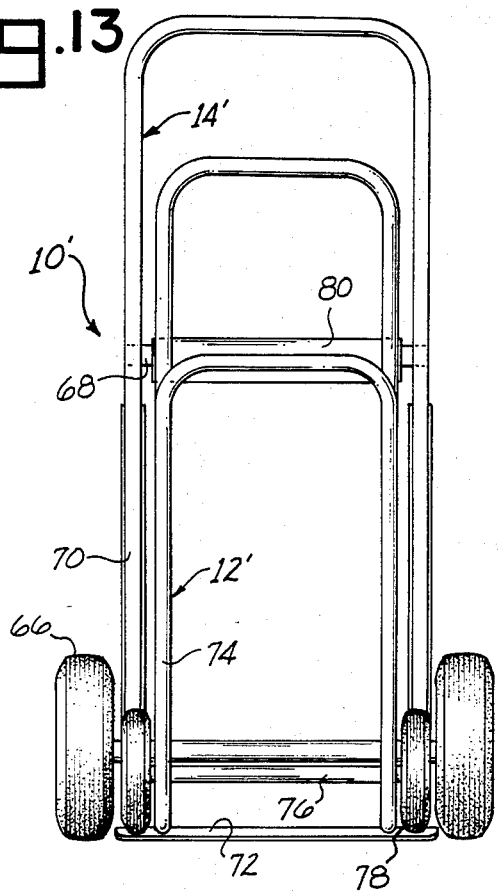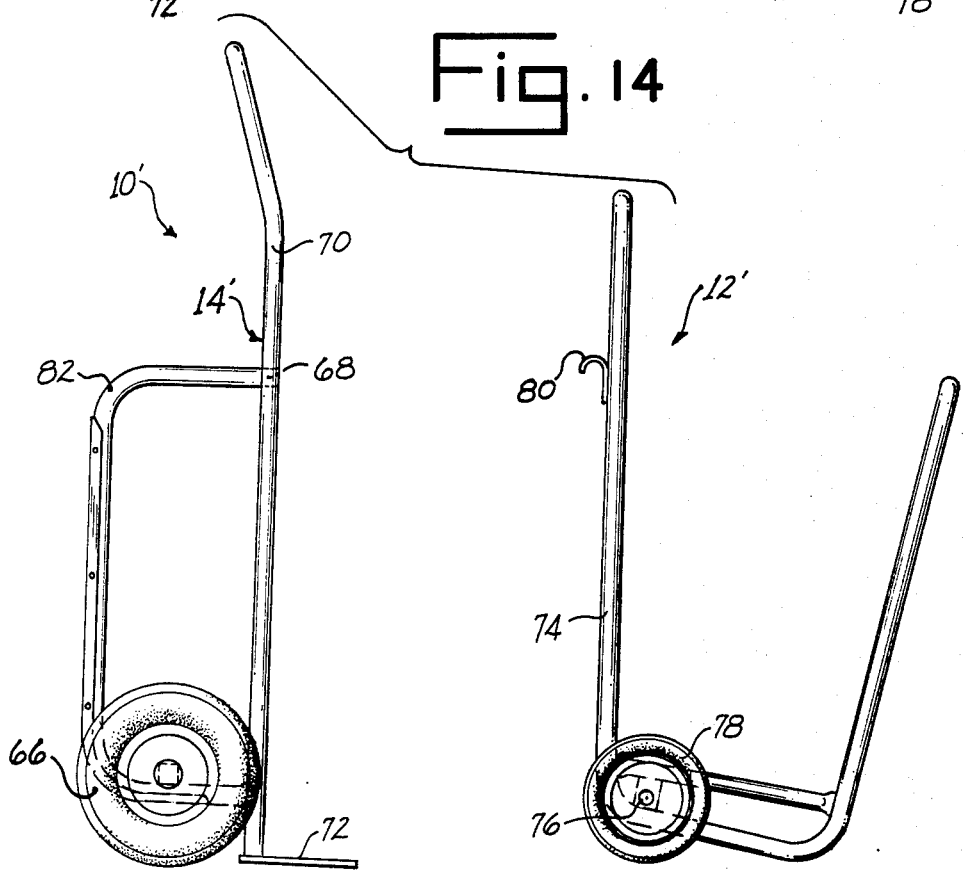

MANUAL UTILITY CART

SUMMARY OF THE INVENTION

This invention relates to a manual utility cart intended primarily for use in transporting firewood from an outdoor stockpile into a living quarter, or building, but is not limited to such usage.

The cart includes a frame which journals a set of large wheels for transport over outdoor terrain. The cart also includes a carrier unit which is detachable from the frame. In one embodiment, the carrier unit is collapsible for compact storage, and has small casters to facilitate movement, while loaded, within a building. This first embodiment also includes a pair of small wheels which are shiftably attached to the cart frame by a linkage and are normally positioned clear of the ground during movement of the cart on the large wheels. The linkage permits shifting of the small wheels to a position lower than the large wheels so that the large wheels will not contact the floor of a building while carrying dirt accumulated while crossing outdoor terrain. A stair climber attachment is linked with the small set of wheels and shifts into position for travel on stairs when the small set of wheels is in lowered position.

A second embodiment of the cart includes a carrier unit which is detachable from the frame and has journaled thereon a small set of wheels. When the carrier unit is to be brought into a building the carrier unit may be disconnected from the frame and moved to desired location within the building. The second embodiment also has a stair climbing attachment which is fixed to the frame and may be used as a support for the frame when the frame is placed in a horizontal storage position.

Accordingly, it is an object of this invention to provide a novel and useful manual utility cart.

Another object is to provide a utility cart for transporting items from an outdoor stockpile into a building without risk of soiling the floor of the building.

Another object is to provide a cart for easily carrying a load up or down a flight of stairs.

Another object is to provide a cart which has a dual set of wheels as alternate rolling support for a load.

Another object is to provide a cart which has a removable carrier portion.

Another object is to provide a cart which occupies a minimum of space when stored.

Other objects of this invention will become apparent upon a reading of the following description.

BRIEF DESCRIPTION OF THE DRAWINGS

FIG. 3 is side elevational view of the cart of FIG. 1 with portions broken away.

FIG. 4 is a rear elevational view of the cart of FIG. 1.

FIG. 5 is a fragmentary sectional view taken along line 5—5 of FIG. 1 showing the attachment of the carrier unit to the frame of the cart.

FIG. 6 is a fragmentary sectional view similar to FIG. 5 showing the carrier unit separated from the frame.

FIG. 7 is a sectional view of the cart similar to FIG. 5 showing the carrier unit in operative position.

FIG. 8 is a sectional view similar to FIG. 7 showing the carrier unit in its collapsed position.

FIG. 11 is a perspective view of a second embodiment of the invention.

FIG. 12 is a side view of the embodiment of FIG. 11.

FIG. 13 is a rear view of the second embodiment.

FIG. 14 is a side view of the second embodiment showing the parts of the cart separated.

DESCRIPTION OF THE PREFERRED EMBODIMENTS

Figure 1:
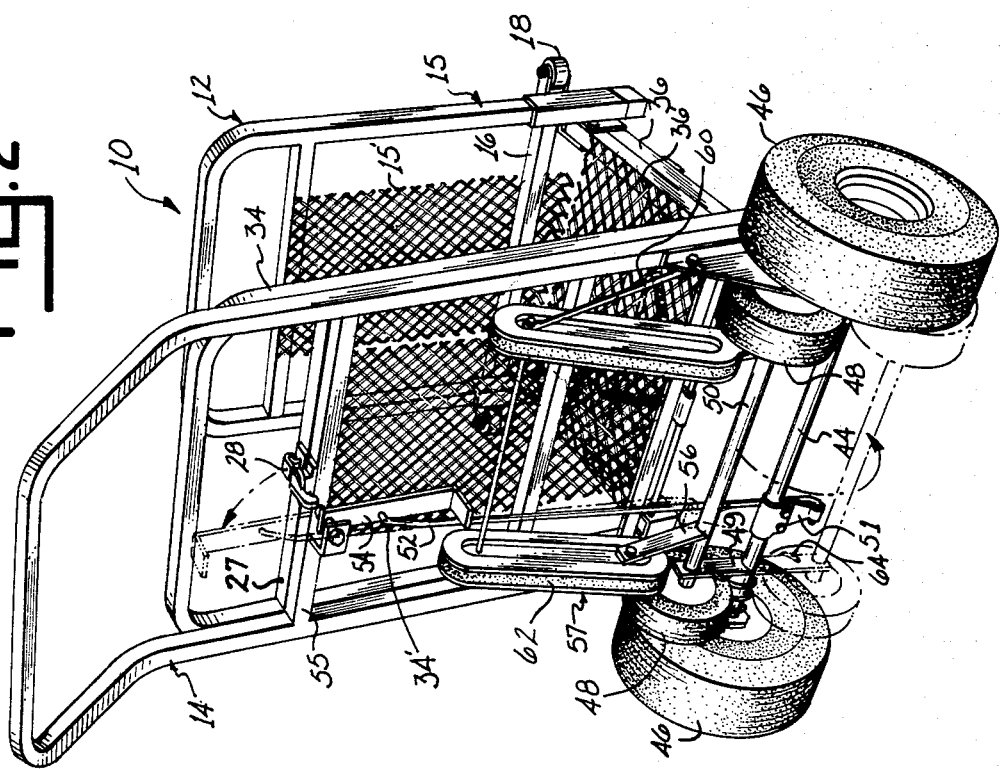
FIG. 1 is a front perspective view of one embodiment of the cart of this invention.
Figure 2:
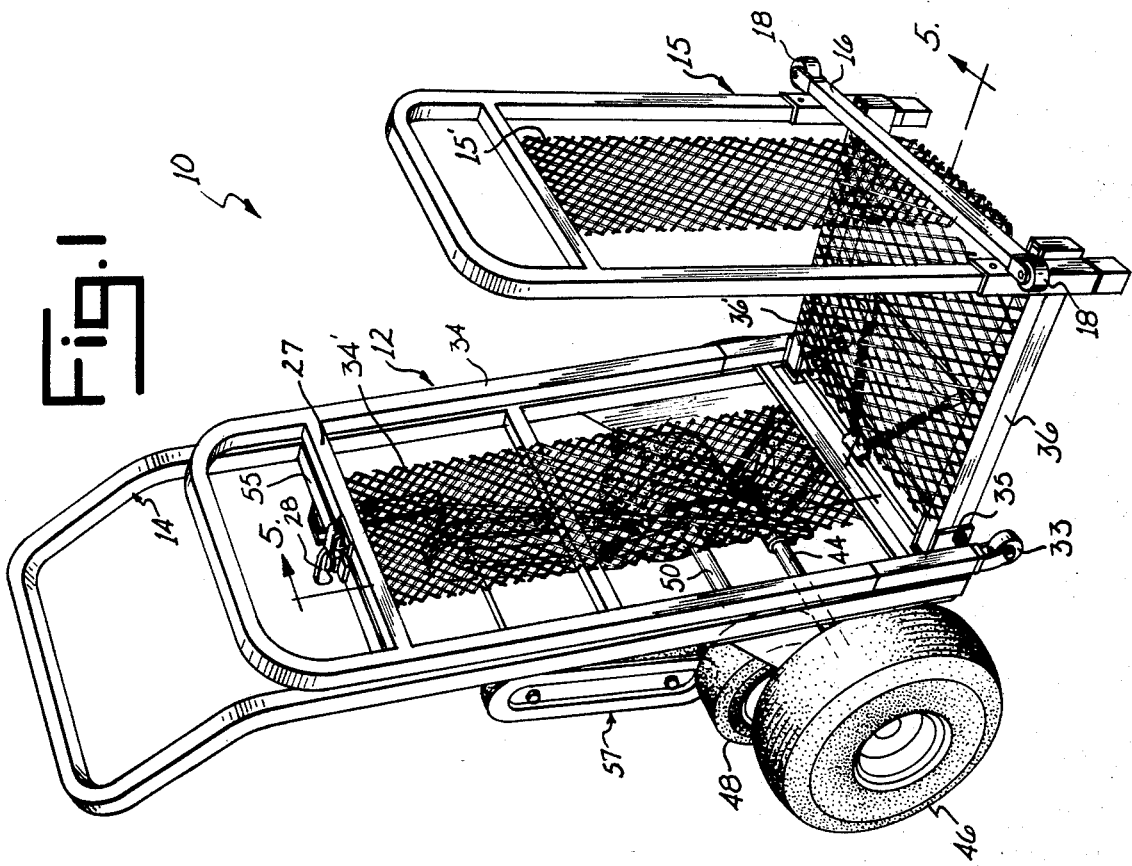
FIG. 2 is a rear perspective view of the cart of FIG. 1.

The preferred embodiments illustrated are not intended to be exhaustive or to limit the invention to the precise forms disclosed. They are chosen and described to explain the principles of the invention and its application and practical use to thereby enable others skilled in the art to utilize the invention.

The utility cart 10, shown in FIGS. 1–10, includes a carrier unit 12 having a cart frame 14 to which the carrier unit is removably attached. Carrier unit 12 is generally U-shaped in its open position, as illustrated in FIGS. 1–3 and 7, whereby firewood or other items may be supported within the carrier unit for transportation. A laterally extensible arm 16 is carried by the front portion 15 of carrier unit 12 and journals rollers 18 at its ends. Each roller 18 is preferably associated with a spring urged pin 20 for locking the arm in a selected extended position. Rollers 18 serve as doorway contactors when the user of the cart is unable to clearly observe the position of loaded carrier unit 12 relative to the doorway as the loaded cart is advanced toward a doorway. Carrier unit 12 is removably connected to upright frame 14 with pins 22 projecting below the lower edges of the carrier unit which fit into openings 24 in a plate 26 projecting forwardly from the lower part of the upright frame. A latch 28, such as that used to lock windows, is carried by the upper end of carrier unit 12 for anchorage to upright frame 14. One part of latch 28 is carried by a cross member 27 extending between upright members 34 of the carrier unit 12 and the other part of latch 28 is carried by a cross bar 55 on frame 14. The attachment of carrier unit 12 to upright frame 14 is illustrated in FIGS. 5 and 6.

Carrier unit 12 is collapsible as illustrated in FIGS. 7 and 8. The carrier unit consists of an inverted U-shaped member whose upright parts 34 are rigidly interconnected by transverse members, such as member 27; a bottom or lower member 36 pivotally connected to the lower end of upright parts 34 at 35; and an inverted U-shaped front member 15 whose sides are rigidly interconnected by transverse members, such as arm 16, and which is pivoted at 37 at its lower part to the bottom member 36. Parts 34, 36, and 15 may mount metal mesh panels 34′, 36′, and 15′. Coil springs 30 are connected at one end to frame 34 spaced above pivot point 35 and connected at opposite ends to member 36 of carrier unit 12 spaced from pivot 34. Springs 30 are so connected in an over-center relation to pivot axis 35 that the springs will assist in shifting carrier unit 12 to collapsed position when unloaded. Caster wheels 33 are mounted at the lower ends of frame 34 to facilitate travel of the carrier unit independently of the cart frame.

Figure 9:
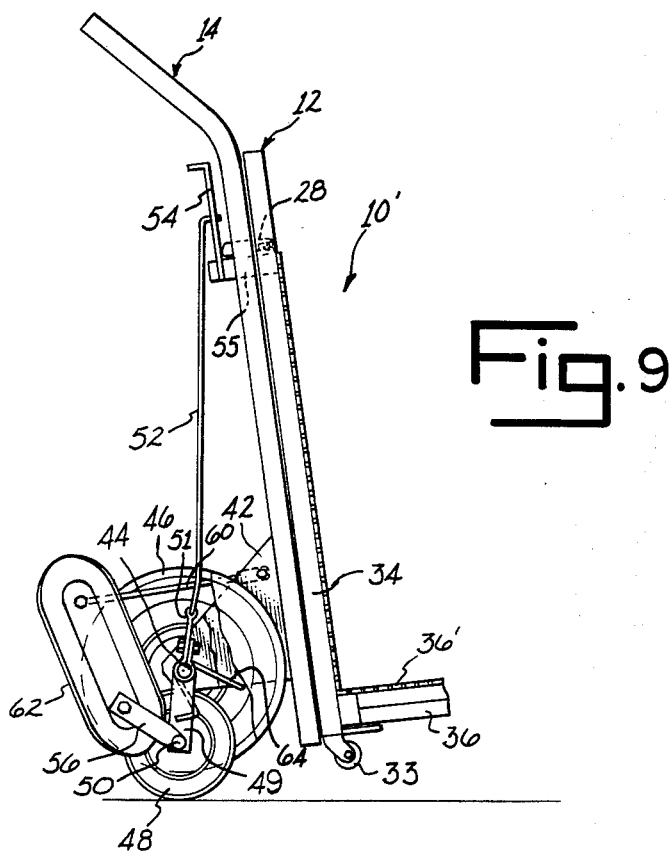
FIG. 9 is a fragmentary side elevational view of the cart showing a set of secondary wheels and a stair climber attachment in their operative position.
Figure 10:
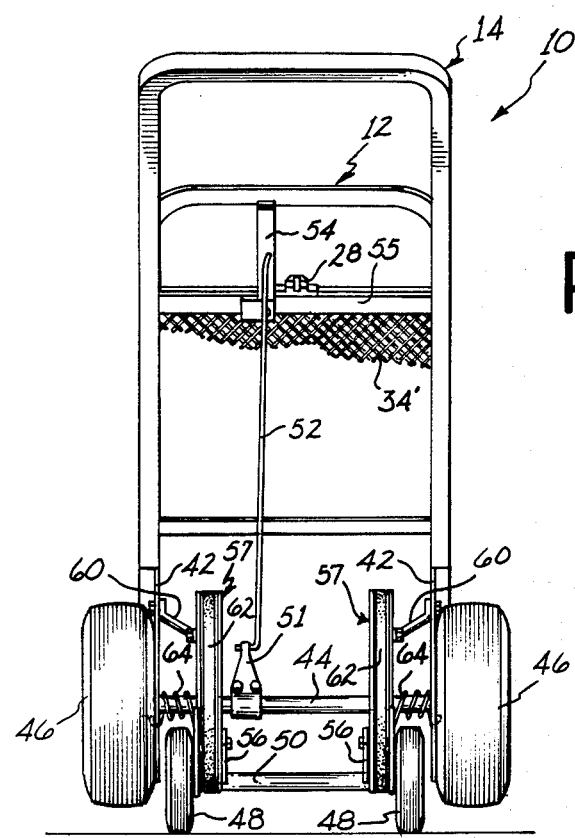
FIG. 10 is a rear view of the cart showing the set of secondary wheels and stair climber attachment in their operative position.

The frame 14 is an inverted U-shaped member whose side parts are interconnected by transverse members such as member 55. Frame 14 mounts rearwardly extending plates 42 which support an axle 44 for large wheels 46 which provide the main support for cart 10 for travel over ground surface. A smaller, second set of wheels 48 is journaled upon an axle 50 which is pivotally connected to axle 44 by arms 49 and is shiftable about axle 44 to position wheels 48 lower than wheels 46 as seen in FIG. 9. A link 52 is connected at one end to an arm 51 carried by axle 44 and is connected at its opposite end to a handle 54 pivoted to the upper part of frame 14, as at member 55. The wheels 46 may be shifted from retracted position shown in FIGS. 3 and 4 to the lower position, shown in FIGS. 2, 9, and 10, by manipulating handle 54. In the lower position the wheels 48 provide an alternate rolling support for cart 10 in which wheels 46 are elevated above a cart supporting surface such as the floor of a home or building.

A pair of frames 57 are pivoted at one end thereof to arms 56 projecting from axle 50. The opposite ends of frames 57 are pivoted to arms 60 pivoted to the lower ends of the sides of cart frame 14. Frames 57 are interconnected to form a rigid unit to the opposite ends of which are journaled sets of pulleys. A belt 62 is trained over each set of pulleys. The pulleys and belts are associated with the set of small wheels 48 such that in shifting of link 52 to lower or raise small wheels 48, the pulley units are shifted between the extended position shown in FIG. 9 and the retracted position shown in FIG. 3. In the extended position shown in FIG. 9, the belts and the small wheels 48 facilitate travel of a loaded cart up or down stairs. The belt pulleys may be locked in their lower position by link 52 and by coil springs 64 which are coiled around axle 44 and anchored at their ends to plates 42 and to arms 49. Springs 64 urge the set of small wheels and the belt unit to their upper position upon shifting of the link 52 to its FIG. 3 position.

A second embodiment 10' of the invention is shown in FIGS. 11–14. Cart 10' includes a rigid frame 14' to which wheels 66 are journaled at its lower end for supporting the frame and carrier unit 12' for rolling transport over outdoor terrain. Frame 14' is preferably of inverted U-shape and includes a crossbar 68 which is connected at its ends to parallel upright members 70 of the frame intermediate the length of members 70. A plate 72 is secured to and projects forwardly from frame 14' at the lower ends of the upright members 70. Frame 14' includes U-shaped skids 82 projecting rearwardly from each frame upright member 70. Skids 82 serve as runners cooperating with wheels 66 of frame 14' to accommodate movement of the frame and a carrier unit 12' up and down stairs. Skids 82 are of a size and position to serve as supports when frame 14' is placed in a horizontal position for storage of items upon the frame.

Carrier unit 12' includes a generally U-shaped rigid frame 74 to which is secured at its lower rear parts an axle 76 to which are journaled secondary wheels 78. In the configuration of the invention shown in FIGS. 11–13, carrier 12' is mounted on frame 14' by a hook 80 projecting from the upper part of the carrier unit which engages crossbar 68 of frame 14'. In this assembled position wheels 78 of carrier 12' rest upon plate 72 of frame 14' so that the carrier unit is supported by and releasably anchored to frame 14'. The engagement of frame 14' and carrier unit 12' is accomplished by moving carrier unit 12' to position it adjacent to frame 14', then tilting the frame 14' forward until crossbar 68 engages under hook 80, and then drawing the frame 14' rearwardly to upright position in which wheels 78 are supported by plate 72. The disengagement of frame 14' and carrier 12' is accomplished by reversing the operations required for engaging the parts.

It is to be understood that the invention is not to be limited by the terms of the above description but may be modified within the scope of the appended claims.

What I claim is:

1. A manual utility cart comprising a rigid wheeled frame, a wheeled carrier unit releasably connected to said frame, and means for releasably connecting said frame and carrier unit, the wheels of said carrier unit accommodating rolling travel of said carrier unit when it is detached from said frame, said frame including rearwardly extending side members at the lower end of each side thereof, a first axle rotatably carried by said side members and journaling a wheel at each of its ends, support arms carried by said first axle for mounting a second axle parallel to said first axle, a wheel journaled at each end of said second axle, said second axle and said second named wheels being located between said first named wheels, and linkage rod means pivotally connected at one end to said frame and eccentrically connected at its other end to a linkage arm rigidly secured to said first axle for shifting said second axle and said second named wheels between a retracted position above said first axle and a lowered position in which said second named wheels support said frame, wherein said frame is selectively supported by either said first named wheels or said second named wheels.

2. The cart of claim 1, wherein a stair traversing elongated member is connected to said second axle and is shiftable with said second axle between an operative stair-engaging position spaced from said frame and a retracted position adjacent said frame.

3. The cart of claim 2, wherein said stair traversing member includes a rigid structure carried by said second axle and journaling dual sets of pulleys, and a belt trained above the pulley of each set.

4. The cart of claim 1, wherein a plate projects from the lower part of said frame and has an opening therein, said carrier unit having a pin at its lower end which fits releasably within said opening, a first latch member carried by an upper part of said frame, and a second latch member carried by said carrier unit for releasable interlock with said first latch member.

* * * * *